(12) United States Patent
Reith

(10) Patent No.: US 7,447,909 B2
(45) Date of Patent: Nov. 4, 2008

(54) METHOD AND SYSTEM FOR LAWFUL INTERCEPTION OF PACKET SWITCHED NETWORK SERVICES

(75) Inventor: Lothar Reith, Frankfurt (DE)

(73) Assignee: Nortel Networks Limited, St. Laurent, Quebec (CA)

( * ) Notice: Subject to any disclaimer, the term of this patent is extended or adjusted under 35 U.S.C. 154(b) by 829 days.

(21) Appl. No.: 10/455,557

(22) Filed: Jun. 5, 2003

(65) Prior Publication Data

US 2004/0255126 A1    Dec. 16, 2004

(51) Int. Cl.
    *H04L 9/00*    (2006.01)
(52) U.S. Cl. .................. 713/183; 726/13; 726/14; 726/22; 726/26; 709/225
(58) Field of Classification Search .............. 713/153, 713/183; 726/3, 13–14, 22, 26; 709/225
    See application file for complete search history.

(56) References Cited

U.S. PATENT DOCUMENTS

| | | | | |
|---|---|---|---|---|
| 5,539,884 | A * | 7/1996 | Robrock, II | 709/227 |
| 6,430,619 | B1 * | 8/2002 | Sitaraman et al. | 709/225 |
| 2002/0049913 | A1 * | 4/2002 | Lumme et al. | 713/201 |
| 2002/0051457 | A1 * | 5/2002 | Eloranta | 370/401 |
| 2002/0078384 | A1 * | 6/2002 | Hippelainen | 713/201 |
| 2004/0071130 | A1 * | 4/2004 | Doerr et al. | 370/352 |

OTHER PUBLICATIONS

Baker et al., "Cisco Support for Lawful Intercept in IP Networks," Internet Engineering Task Force: Internet Draft, pp. 1-15 (Apr. 2003).

* cited by examiner

*Primary Examiner*—Thanhnga B Truong
(74) *Attorney, Agent, or Firm*—Trop, Pruner & Hu, P.C.

(57) ABSTRACT

A method for lawful interception of packet switched network services, comprising the steps of:
when a user accesses the network and is identified by a target-ID at a primary interception point of the network, sending the target-ID to an interception management center,
checking at the interception management center whether the user is a lawful interception target and sending an encrypted interception instruction set to a secondary interception point,
decrypting said interception instruction set at the secondary interception point and performing an interception process in accordance with the interception instruction set, said interception process including the transmission of encrypted interception and dummy data to a mediation device, wherein said dummy data are added for obscuring true interception traffic between the secondary interception point and the mediation device.

15 Claims, 4 Drawing Sheets

METHOD AND SYSTEM FOR LAWFUL INTERCEPTION OF PACKET SWITCHED NETWORK SERVICES

BACKGROUND OF THE INVENTION

1. Field of the Invention

The invention relates to a method and a system for lawful interception of packet switched network services.

According to recent legislation in many countries, providers of packet switched network services are obliged to provide facilities that permit lawful interception of the data traffic over the network. While some countries prescribe that all traffic of all users or subscribers to the network services shall be monitored, the laws of other countries provide that such general monitoring is forbidden and interception of traffic to or from users, even interception of only the connection data, is permitted only for specific users or subscribers who qualify, e.g. by court order, as lawful interception targets. Of course, the service provider has a responsibility to make sure that the identities of lawful interception targets are kept secret.

Accordingly, there is a demand for a method and a system for lawful interception of packet switched network services that can be implemented and operated at relatively low costs and can easily be adapted to differing legal provisions and requirements in various countries.

2. Description of the Related Art

A conventional approach is the so-called hardware monitoring, which means that specialized equipment necessary for interception purposes is installed at a location where the specified lawful interception target gets access to the network. This involves high costs and has the further drawback that the secrecy requirement is difficult to fulfill, because of the potential visibility of the hardware to not security-screened staff. Moreover, this approach is not practical when the network can be accessed from mobile units such as mobile telephones, laptop computers and the like, or through public access points such as WLAN hot spots or simply by dialing in over a PSTN with a modem or via ISDN from a hotel or public telephone.

Another known approach is the so-called software monitoring, wherein suitable software is implemented within the internal network of the service provider for identifying the subscribed users that connect to the network and for deciding whether or not the traffic to or from these subscribers shall be intercepted. This solution involves a certain amount of interception-related traffic within the internal network of the service provider, and this traffic may be observable by a relatively large number of employees of the service provider, so that careful security screening of the personnel is necessary in some countries. This not only constitutes a high cost factor but may also raise intricate legal problems in view of employment contracts and the like.

The European Telecommunications Standards Institute (ETSI) has published specifications for a lawful interception reference model (ETSI-document ES 201 671).

An Internet document of Baker et al.: "Cisco Support for Lawful Intercept in IP Networks", April 2003, http://www.rfc-editor.org/internet-drafts/draft-bakerslem-architecture-00.txt, recommends that intercept traffic between an interception point and a mediation device is encrypted in order to limit unauthorized personnel from knowing lawfully authorized intercepts.

SUMMARY OF THE INVENTION

According to the invention, a method for lawful interception of packet switched network services, comprises the steps of:

when a user accesses the network and is identified by a target-ID at a primary interception point of the network, sending the target-ID to an interception management center, checking at the interception management center whether the user is a lawful interception target and sending an encrypted interception instruction set to a secondary interception point, decrypting said interception instruction set at the secondary interception point and performing an interception process in accordance with the interception instruction set, said interception process including the transmission of encrypted interception and dummy data to a mediation device, wherein said dummy data are added for obscuring true interception traffic between the secondary interception point and the mediation device.

A system implementing the method according to the invention comprises at least one Packet Switching Service Point (PSSP) that includes interception functionality (e.g. an Internal Intercept Function (IIF) as specified in the ETSI model) and thereby serves as the primary and/or secondary interception point, and a Mediation Device (MD) through which the intercepted data and related information are handed over to one or more Law Enforcement Agencies (LEAs) who want to receive and evaluate the intercepted data. The PSSP may be any node in the network where data packets, including packets that contain the user-ID of a subscriber to the network, can be intercepted. The above-mentioned primary and secondary interception points may be formed by different PSSPs but are preferably formed by one and the same PSSP. The system further comprises an Interception Management Center (IMC). This is the place where the interception policy is provisioned as requested by the law enforcement agencies. The IMC stores the identities of lawful interception targets (user-IDs, device-IDs, access-line IDs or other means to identify a target user with reasonable probability), that are serviced by the one or more PSSPs that are associated to this IMC. The IMC may further store information on the modes and scopes of interception that are applicable to the various targets and non-targets.

As is well known in the art, a user who has subscribed to the services of a packet switched network service provider is uniquely identified by any suitable identification that is called "user-ID" and may consist of the name of the user or any other suitable identifier such as a pseudonym. Alternatively or additionally, a user or, more precisely, an interception target may be specified by an access line ID such as a telephone number, a DSL-Line-ID, an ATM virtual channel or the like. In the present application, the term "target-ID" is generic to user-IDs and access line IDs and device IDs such as the MAC-Adress of a network interface card utilized by the target user.

When a user starts a usage session he gets identified by a minimum of one target-ID. Sometimes multiple target-IDs are present. The following are common target-ID classes:

1. a User-ID (usually combined with password for authentication). This is often summarized as "something you know" (or at least are supposed to know—the user or a legitimate user may have stored the user-ID and the password on the device being used, so the current user may not need to know the user-ID if he has access to the device with username and password stored).

2. a Device-ID of a device that he is using (such as a MAC adress of a network interface card, or a mobile station ID of a mobile handset, or via a Subscriber Identification Module in a mobile phone). This class of target-ID may be summarized as: "something you own", and is particularly useful in mobile scenarios. An IP-adress such as an IP-Version 6 adress may be considered a device ID in a mobile IP scenario when the IP-adress is assigned to the device.

3. an access network resource ID referred to hereafter as access-line-ID. This is a network interface ID of a network element that is not owned by the user, rather by the service provider or a business-partner of the service provider. An example is a DSL-line ID in a DSL access network, or the combination of an ATM device name, slot-number, port-number and ATM virtual Circuit ID. Another example would be an IP-Adress permanently assigned to said network interface. This class of target-IDs may be summarized as: "something you probably utilize in the network" as is the case for example with the DSL-Line into the house of a target user. This concept is very similar to voice wiretapping in fixed networks, which is usually done to the telephone access line as well and intercepts all communications over that telephone line, regardless if the intended target user speaks or somebody else having access to the phone attached to the line.

When the user connects to the network with a target ID being a user-ID, a logon procedure is performed in which the user has to authenticate himself by indicating his user-ID and, optionally, a password and the like. Conventionally, this authentication process has the purpose to permit the service provider to check whether the user has actually subscribed to the services. In case of commercial service providers, the authentication process is also needed for billing purposes. In some cases the user identification or logon procedure is performed utilizing a device-ID for identification of the device used by the user, without requiring a password, for example when providing an IP address granting limited access via DHCP based on a MAC address presented by the device or by a network interface card being part of the device. Such procedure is common when providing limited scope access to a user prior to proper authentication. In case of fixed line access, there may be no special logon procedure, as the user is being considered fixed to a certain access line which may have been permanently provisioned with a fixed IP address for example (similar to the situation in telephony, where a telephone line is permanently provisioned with a fixed telephone number). In some cases the device may present an IP-address such as a fixed IP-Version 6 address that has been assigned to the device.

According to the invention, the fact that the user has to indicate his user-ID or utilize at least one target ID when connecting to the network is also utilized for interception purposes. To this end, the user ID (and the access line ID or device ID, as the case may be) is detected at the PSSP serving as an interception point. It will be clear that, in order to be able to intercept all subscribers to the network, if required, the PSSPs having interception facilities must be strategically located in the network so that no subscriber can get access without passing at least one interception point. The target-ID is sent to the IMC where it is checked against the list of lawful interception targets and explicit non-targets. The IMC responds to the same PSSP from which the target-ID originated—or else to another PSSP—with an encrypted message indicating at least whether or not the target-ID represents a lawful interception target. The response, which is called an interception instruction set, may further specify whether the target is identified by its user-ID (i.e. interception of traffic to or from this user) or by its access line ID (i.e. interception of all traffic over this line, irrespective of the identity of the user) or by another temporary target-ID that is included in the interception instruction set, and may also include additional information. For example, the interception instruction set may include a "conditional interception instruction", instructing the PSSP to monitor the traffic associated with the target-ID and start the interception of the complete traffic or a portion of the traffic only when a certain trigger condition occurs, said trigger condition being one of: usage of certain network or content resources or usage of a certain catchword, virus signature or bit-pattern specified in the interception instruction set. As another example, the interception instruction set may specify different interception classes indicating whether all packets or only a random selection of packets or only a specified subset of packets originating from or sent to the target are to be intercepted. The PSSP will then intercept the data packets in accordance with these instructions and will send them, again in encrypted form, to the mediation device.

The PSSP includes both, encryption and decryption facilities. The IMC includes at least encryption facilities for the interception instruction set, and the mediation device includes at least decryption facilities.

It is an advantage of the invention that the traffic between the PSSP and the mediation device and also most of the traffic between the PSSP and IMC is encrypted, so that it cannot be understood by an observer monitoring the traffic (encryption of the target-ID sent to the IMC may however be dispensed with). Thus, even the service provider's employees, for whom it would most likely be possible to monitor the traffic, cannot easily discover the identity of the lawful interception target. From the viewpoint of secrecy requirements, it is a further advantage that it is not necessary to implement the functionality of the IMC at each individual PSSP. The IMC and the mediation device may be located remote from the PSSP(s) and may thus be centralized, so that considerable cost savings can be achieved without violating secrecy requirements. Further, since no information on the identity of the lawful interception targets is permanently present at the individual PSSPs, and, if present, is stored in encrypted form or in an encrypted file, the personnel having access only to the PSSPs will not be able to identify the interception targets or determine if a true interception target is accessing that particular PSSP. The identity of the interception targets will only be known to a very limited number of employees, if any, who have access to the information stored in the single IMC or relatively few centralized IMCs, or have special operator privileges not available to non-security screened staff. It is understood that only a few staff members of the service provider, if any, have access to a secured area or locked room where the IMC may be located as well as the Mediation Device.

According to another important feature of the invention the security and secrecy is further enhanced by obscuring even the fact that interception-related traffic occurs between the PSSP and the mediation device. To this end, the interception instruction set sent from the IMC to the PSSP may specify that even in those cases in which the user is not to be intercepted or is not even a lawful interception target at all, dummy data traffic is created between the PSSP and the mediation device, so that an unauthorized observer who may monitor the encrypted data traffic cannot decide whether the traffic he sees is only dummy traffic or a hint to an actual interception process.

This enables the service provider to outsource the operation of the IMC and/or the mediation device to a third party company, which may handle all interception warrants presented from law enforcement agencies on the service-provider's behalf, without any employee of the service provider knowing about the details of a warrant.

The dummy interception traffic may be triggered by real packet arrival events at the PSSP or, alternatively, by random events or any other events, such as timer expiry. However, the dummy traffic shall not contain any subscriber data. In case that real subscriber traffic was used as triggering event for the dummy traffic, the contents are scrambled and made useless, so that the receiver or an observer cannot gather any useful information on the actual subscriber traffic. Thus, in spite of the dummy traffic, the privacy of the subscriber will be protected in case that the subscriber is not a lawful interception target.

Optionally, the invention may further include one or more of the following features:

- Sending re-classification messages from the IMC to the PSSP in order to reclassify an already active user to a different interception mode when, for example, a new interception warrant has to be implemented for an already active user, a warrant for an active user shall be terminated when the duration of the warrant has expired, a warrant for an active user is being withdrawn prior to expiration, or when the scope of a warrant for an active user is being changed necessitating a reclassification, e.g. from partial to full interception, or from no-interception to dummy-interception, or from dummy interception to no-interception.
- Hiding the information about the user interception class associated with an active user from not security screened operations staff of the service provider, by implementing special operator command privileges at the PSSP, in order to prohibit non-intercept-privileged operators from being able to successfully execute commands that show the user interception class of an active user, and/or by storing the user interception class in encrypted form on the network elements, where the decryption key is not available to operators without intercept-privilege.
- Discarding the dummy data directly after receipt at the mediation device, or alternatively using these dummy data for obscuring handover traffic from the mediation device to the law enforcement agency.
- Statically or dynamically determining at the IMC the relation between real interception traffic and dummy traffic considering both the cost of the dummy traffic as well as the security requirements under the circumstances, where the applied mix of user intercept classes may depend on the regulatory requirements mandated by authorities, the time of day, the amount of simultaneously active users at a specific interception point (PSSP), the current traffic load, the theoretical peak-bandwidth required for interception traffic of real targets from a specific interception point, risk classification levels associated with the operational model applied, and general risk levels prevailing over a period of time in a specific country as declared by governmental authorities.

In another embodiment of the invention a constant (or varying) amount of "camouflage" traffic is created and sent at all times (even if no real interception is taking place). This camouflage traffic is composed of true intercept traffic and dummy data at a ratio that depends on the demand for true intercept traffic, so that the true intercept traffic will always be hidden in the amount of camouflage traffic. The camouflage packets may have a fixed size or variable sizes that are unrelated to packet sizes used by a particular subscriber. The volume of the camouflage traffic will be at least as high as the maximum theoretical or practical volume of real interception traffic plus any overhead to encrypt and encapsulate it into the stream of fixed-length camouflage traffic packets. This would make it impossible for an observer performing traffic analysis to determine if a real interception is taking place, and it would make it totally impossible to determine the fact of lawful interception taking place, even when sending the internal lawful interception traffic to the MD over insecure public networks like the Internet. It would also make it impossible even for a malicious member of the operations staff (without interception operator command privileges) which is cooperating with a target, to test if a particular user is currently a target.

BRIEF DESCRIPTION OF THE DRAWINGS

Preferred embodiments of the invention will now be described in conjunction with the drawings, in which.

DETAILED DESCRIPTION OF THE PREFERRED EMBODIMENTS

Figure 1:
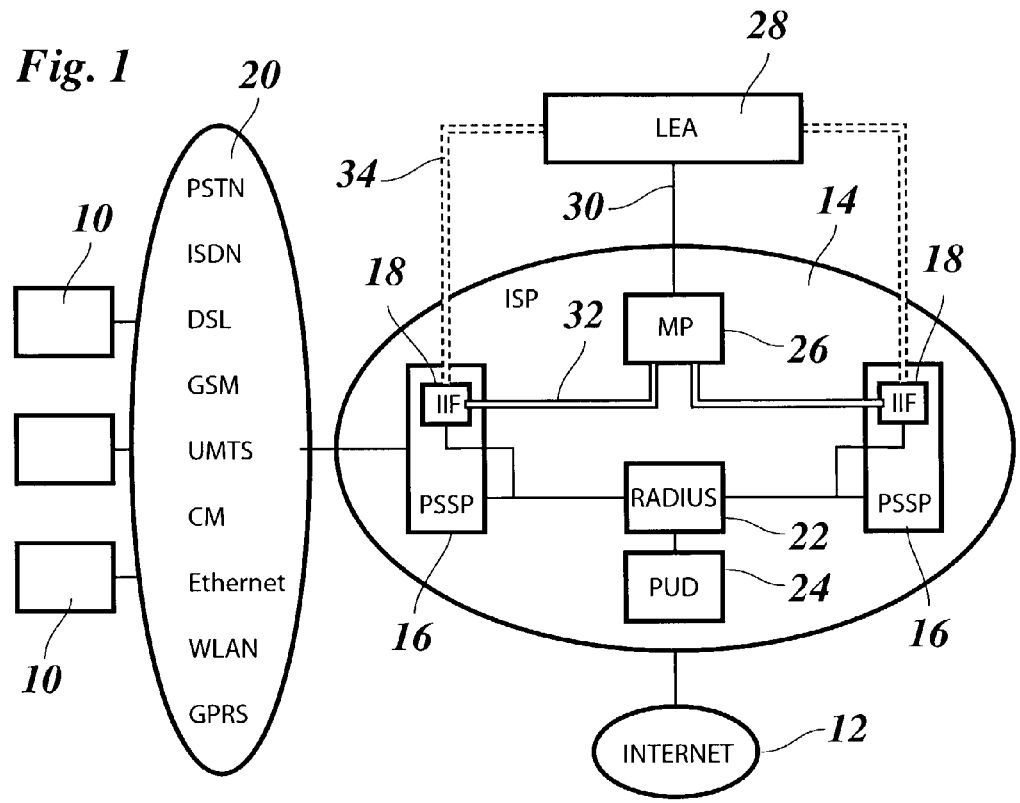
FIG. 1 is a diagram illustrating a system according to one embodiment of the invention.

As is shown in FIG. 1, a packet switched network services provider, an Internet Service Provider (ISP) in this example, has responsibility for a certain number of facilities allowing a number of end users 10 to get access to the network, i.e. the Internet 12. These facilities are interconnected by an internal network 14 of the ISP and comprise a number of Packet Switching Service Points (PSSP) 16, i.e. switching nodes, that are each equipped with an Internal Interception Function (IIF) 18.

In the example shown, the PSSPs 16 equipped with the IIFs 18 are situated at the subscriber edge of the network 14, i.e. the place where the end users 10 connect to the internal network 14 and hence to the Internet 12 via any suitable access network 20 such as a Public Switched Telephone Network (PSTN), an integrated Services Digital Network (ISDN), a Digital Subscriber Line (DSL) access network, a mobile telephone network (2 G like GSM, 2,5 G like GPRS or 3 G like UMTS), a WLAN access network, an Ethernet access network or a Cable Modem access network (CM) or a combination of the same. However, the PSSPs may also be located at any other node within the internal network 14, as long as it is assured that the target data traffic of interest to and from the end users 10 will pass at least one of the PSSPs equipped with an IIF 18. As an example, a PSSP may be a "Shasta 5000 BSN" (trademark) available from Nortel Networks Limited (BSN stands for Broadband Services Node). Through the internal network 14, the PSSPs are connected to at least one authentication server, in this example a "Remote Authentication Dial-In User Service" (RADIUS) server 22, cooperating with a Personal User Data Base (PUD) 24 which stores the user data of the subscribers (the RADIUS protocol is described in RFC 2865, entitled "Remote Authentication Dial-In User Service (RADIUS)", and in RFC 2866 entitled "RADIUS Accounting", both published by the Internet Engineering Task Force or ganization (IETF) in June 2000).

When an end user 10 connects to the services of the ISP, he will authenticate himself by a suitable user-ID by which the specific user is uniquely identified. The PSSP 16 forwards the user-ID to the RADIUS server 22, thereby triggering an authentication procedure in which the user-ID is checked against the personal user data base 24 to see whether the user is authorized to the services of the ISP. UVhen the authentication procedure is successful, a user session for this specific user starts, and the user may be recorded in the personal user data base 24 as an active user. When the user logs off or gets disconnected from the PSSP, the user may again be stored as an inactive user. The messages indicating the start and the end of a user session will be stored and processed for billing purposes if the user has not subscribed to a flat rate.

The internal network 14 further comprises at least one Mediation Point (MP) 26 which serves as an interface between the internal network 14 of the ISP and a Law Enforcement Agency (LEA) 28 that is authorized to intercept the traffic of either all users or of a number of specified users that qualify as lawful interception targets. The identities of the lawful interception targets are stored at the mediation point 26, preferably together with more detailed information on the mode and scope of interception that is allowed and desired for each individual target. The mediation point 26 is connected to the facilities of the law enforcement agency 28 through a safe communication channel 30 which may be used for sending the intercepted data to the LEA 28 and also for loading the information specifying the interception targets into the mediation point 26.

Through the internal network 14, the mediation point 26 is connected to the interception function 18 of at least one, preferably a plurality of PSSPs 16, as is symbolized by broad, contoured connection links 32 in FIG. 1. The contoured representation of the links 32 indicates that traffic on these links occurs only in encrypted form.

When an end user 10 has logged on by the procedure described above, the user-ID that is sent to the RADIUS server 22 is also supplied to the internal interception function 18 of the pertinent PSSP 16. Triggered by this event, the IIF 18 creates an encrypted interception instruction request, including the encrypted user-ID, and sends the same via link 32 to the mediation point 26. Here, it is checked whether the user who has logged on is a lawful interception target, and an encrypted response is sent back to the IIF 18 through the link 32. This encrypted response message indicates whether or not the user is to be intercepted and in which way this is to be done. In accordance with the instructions contained in this encrypted response, the IIF 18 will intercept some or all of the traffic from or to the end user 10 and will send the intercepted data and/or intercept related information, again in encrypted form, to the mediation point 26 from where they are forwarded to the law enforcement agency 28 through the safe channel 30. As an alternative, the intercepted and encrypted data may be sent directly to the law enforcement agency 28 through encrypted channels 34, as has been indicated in phantom lines in FIG. 1.

An example of such an interception procedure will now be described by reference to FIG. 2. In step S1, a user 10 logs on to the services provided by the ISP and is identified by a target-ID, a user-ID in the present example. In step S2, the PSSP 16 through which the user has connected to the network, or more precisely the IIF 18 thereof, sends the encrypted user-ID to the mediation point 26. In step S3, the mediation point 26 returns an encrypted lawful interception instruction set to the PSSP 16. This instruction set includes at least the information that the user shall be intercepted or shall not be intercepted. Instructions may further specify other intercept related information, for example, that only access-connection data (e.g. time and duration of the user's online-usage session) or only certain end to end connection data (e.g. URLs of websites visited, or IP addresses of Voice over IP communication partners) but not the contents of the communications itself shall be intercepted. Another instruction may specify that all traffic (connection data and/or contents) to and from the user shall be intercepted or only messages sent from the user to another destination or only messages sent from other sources and received by the user. Yet another instruction may specify that all data packets or only a subset of the transmitted data packets (e.g. a random selection) shall be intercepted or that interception of all following data packets shall be triggered by specific data packets that represent specific catch words that are related to unlawful activities. Yet another instruction may specify that interception is restricted to traffic to or from specific sites or classes of sites, e.g. web servers located in a specific country, or to specific protocols or flows such as SIP traffic and RTP traffic which are utilized to signal and carry voice over IP or multimedia communications.

The internal interception function 18 will then perform the interception procedure in accordance with these instructions. In step S4, the user connects to a web site in the Internet 12, typically by entering a Universal Resource Locator (URL) of the desired web site. Then, in step S5, the connection data, i.e. the URL, will be sent in encrypted form to the mediation point 26.

If the instruction set specifies that contents shall also be intercepted, the data packages representing the contents of the selected web page and being sent to the user 10 will also be intercepted and will be sent in encrypted form to the mediation point 26 or to the LEA 28 in step S6.

As another example, the steps S4-S6 may also consist of the user 10 sending an e-mail to a specific e-mail address. Then, the encrypted e-mail address will be transmitted in step S5 and the encrypted contents of the e-mail will be transmitted in step S6. Conversely, if step S4 consists of the user retrieving an e-mail from his mail box, steps S5 and S6 will consist of encrypting and transmitting the origin and the contents of the e-mail. If the mail box of the pertinent user is provided by a foreign ISP in another country, this mail box may also be guarded by a PSSP having an internal interception function 18 and located at a border gateway, so that the e-mail addressed to the specific user may be intercepted already when it is sent to the mail box.

In step S7, the user logs off or disconnects from the internal network 14 of the ISP. This triggers an encrypted log off message being sent to the mediation point 26 in step S8.

It will be understood that, because all the traffic between the PSSP 16 and the mediation point 26 is encrypted, this traffic can only be understood by the pertinent equipment and not by any individuals monitoring the traffic on the channel 32, not even by the personnel of the ISP itself, except the very restricted number of employees having access to the mediation point 26. Thus, secrecy of the interception-related information can be assured with high reliability. Since all relevant interception-related instructions are stored centrally in the mediation point, the system can easily be managed at low costs. The hardware and software components of the internal interception functions 18 to be implemented in the individual PSSPs 16 are the same for all PSSPs.

Figure 3:
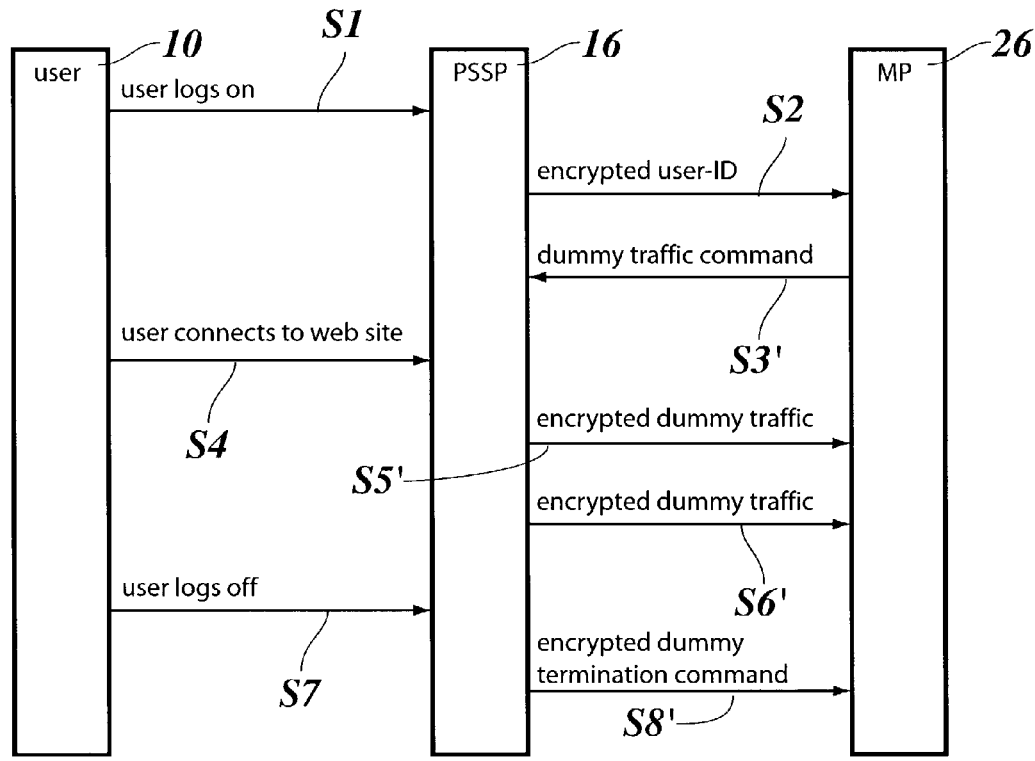

FIG. 3 illustrates the method that is employed in cases where the user who has logged on in step S1 is not to be intercepted at all. In this case, the response to the request S2 in step S3' consists of a dummy traffic command specifying that the user is not to be intercepted but dummy traffic shall be generated on the encrypted link 32 in order to disguise the fact that this user is not being intercepted. This will make it difficult for a person monitoring the traffic on the link 32 to draw any conclusions as to the identity of lawful interception targets from the traffic occurring on this link.

The dummy traffic may be generated by the interception function of the PSSP 16 at random. In the embodiment shown in FIG. 3, however, this traffic is also triggered by the events S4 and S7 and by the occurrence of data packets to or from the user at the PSSP 16. Thus, when the user has connected to a web site in step S4, this event triggers encrypted dummy traffic in step S5'. The contents of this traffic will however be senseless or scrambled and in any case anonymized, so that the law enforcement agency or an observer cannot gain any knowledge on the actual event S4. It may be discarded at the mediation point directly upon receipt. Thus, this kind of traffic will be allowed even in cases where interception of the pertinent user is legally forbidden. Similarly, any packet events at the PSSP 16 will trigger encrypted dummy traffic in step S6' in order to mock the interception of contents. Of course, such dummy traffic may also be generated in case of FIG. 3 if the lawful interception instruction set specifies intercept related information, e.g. that only connection data but no contents are to be intercepted. Further, the dummy traffic command sent in step S3' may itself include senseless "dummy" data in order to make the length of this command resemble the length of a true interception instruction set.

Figure 2:
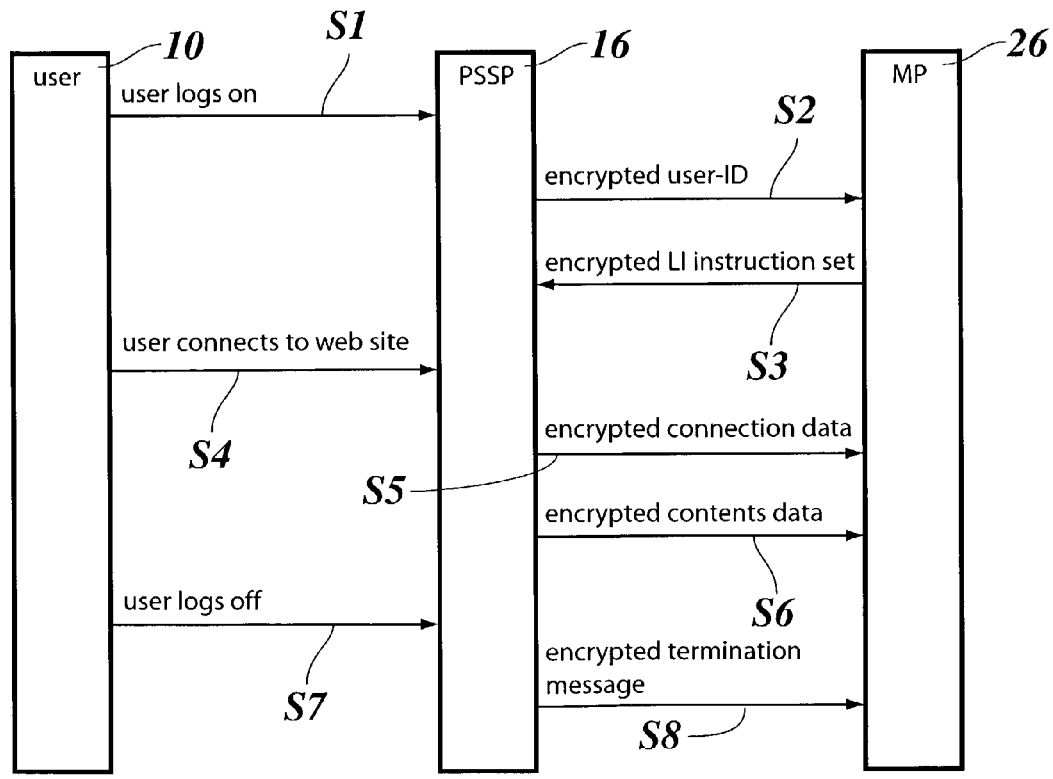
FIGS. 2 and 3 are diagrams illustrating two examples of the method according to the invention.

When, in FIG. 3, the user has logged off in step S7, this triggers an encrypted dummy termination command in step S8' mocking the step S8 in FIG. 2. Since, however, the identity of the user is not known to the LEA 28 or to an observer, no meaningful information can be gathered from the step S8', neither.

Although the system is capable of real time interception, it may be advantageous to send the messages in steps S5, S5' and S8, S8' with a random time delay, so that the user may not be identified through coincidence of events S4 and S5 or S7 and S8. The exact time of the events S4 and S7 may be included in the encrypted messages in the form of a time stamp, if the user is a lawful target.

Comparing FIGS. 2 and 3, it can be seen that, unless the encryption code is cracked, the pattern of traffic on the link 32 for users that are actually being intercepted is indistinguishable from the pattern for users that are not intercepted.

Since all the traffic on the link 32 is encrypted, the mediation point 26 may even be located outside of the internal network 14 of the service provider. This has been exemplified in FIG. 4, where the mediation point 26 is located within the facilities of the law enforcement agency 28. In some countries, it may however be required that the service provider has control over the mediation point 26. In other countries, it may be required that the mediation point is located in the domain of the Law Enforcement Agency, in yet other countries it may be mandated or at least possible that the mediation point is being operated by a third party that is especially certified by governmental authorities.

The mediation point 26 may store the target-IDs of all active users together with an identification of a minimum of one PSSP used for accessing the network, and an identifier used to identify the usage session within that PSSP, so that the interception of a new target may be provisioned by sending an appropriate interception instruction set even when the user is already active. Likewise, the interception may be terminated or the interception instruction set may be changed while the user remains active.

Figure 4:
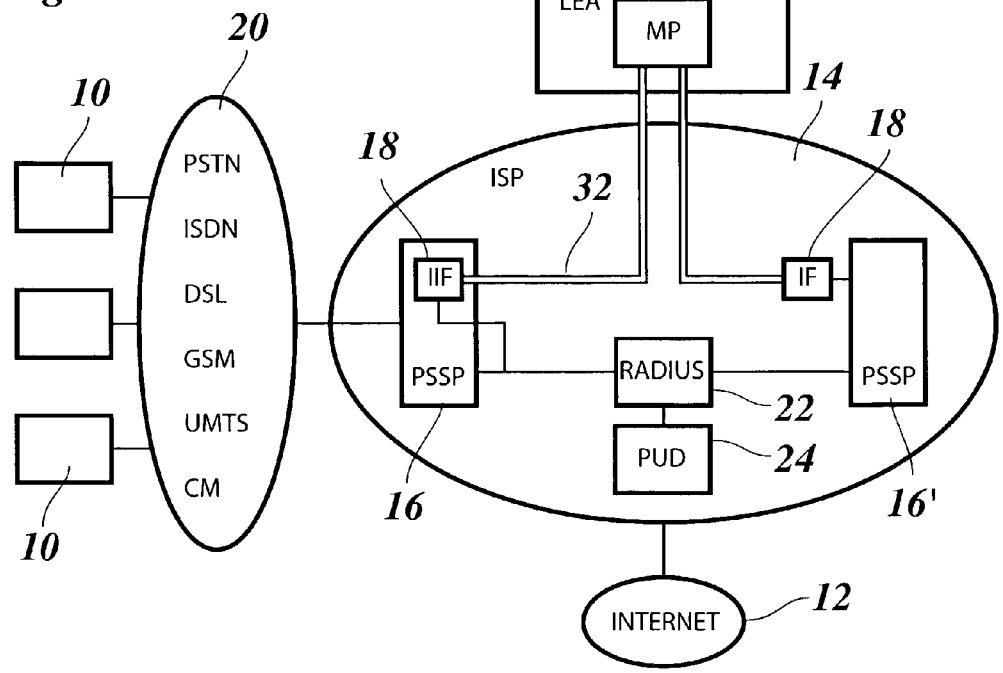
FIGS. 4 to 9 are diagrams showing a modified embodiments of the system.

FIG. 4 further shows an example of a PSSP 16' for which the interception function (IF) 18 is not internal to the PSSP but is implemented in a device outside of the PSSP and connected thereto by a suitable interface.

Figure 5:
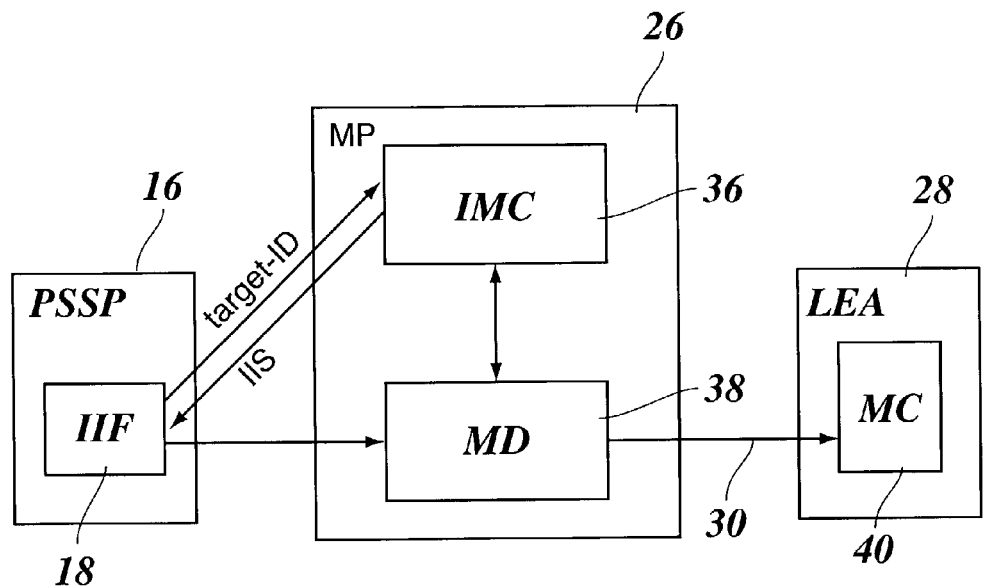

As is shown in FIG. 5, the function of the mediation point 26 can be subdivided into two main function blocks which are called Intercept Management Center (IMC) 36 and Mediation Device (MD) 38. The IMC 36 is the function that receives the user ID or, more generally, the target-ID from the IIF 18 and returns the interception instruction set IIS. The MD 38 is the entity that receives the encrypted intercept data and/or dummy data from the IIF 18 and implements the handover interface to a Monitoring Center (MC) 40 in the law enforcement agency 28. If the line 30 connecting the MD 38 to the MC 28 is not considered to be safe enough, the data handed over to the Monitoring center 40 may still include the dummy data generated by the IIF 18.

Figure 6:
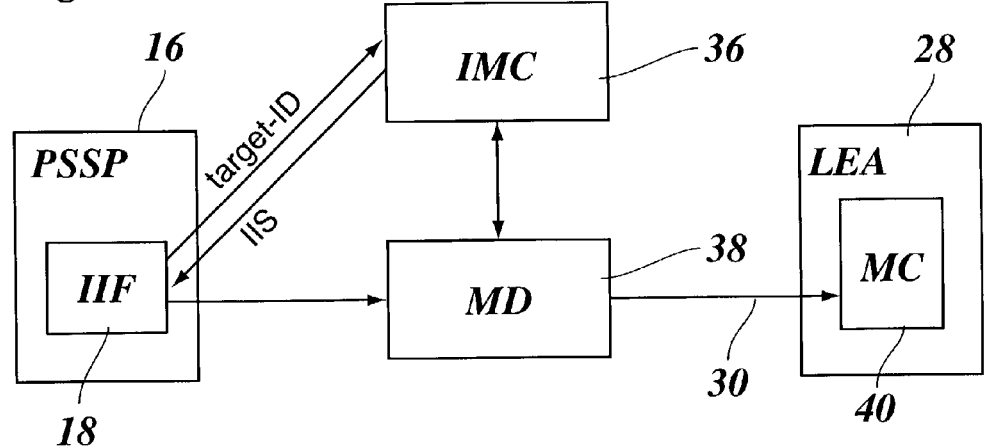

FIG. 6 shows a modified embodiment, in which the interception management center 36 and the mediation device 38 are not integrated into a common device (such as the mediation point 26 in FIG. 5) but are embodied as separate physical entities. In this case the PSSP 16, the IMC 36, the MD 38 and the MC 40 might be operated by two, three or even four different legal entities.

According to a modification which has not been shown, the mediation device (MD) 38 might as well be combined with the monitoring center (MC) 40 in the LEA 28.

Figure 7:
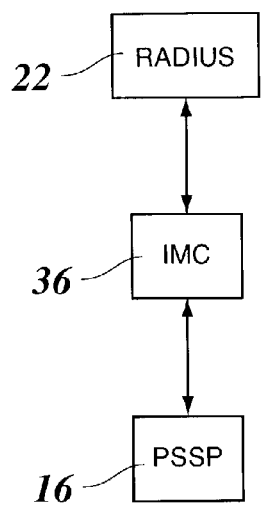
Figure 8:
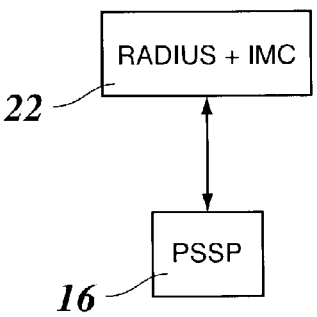
Figure 9:
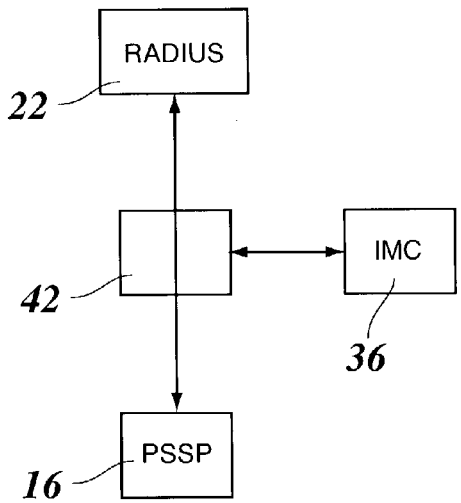

FIGS. 7 to 9 show different arrangements of the interception management center (IMC) 36 in relation to the RADIUS Server 22 and the PSSP 16. In FIG. 7 the IMC 36 acts as a "proxy RADIUS server". This means that the IMC appears as a RADIUS server toward the PSSP 16 which acts as a RADIUS client, and at the same time the IMC acts as a RADIUS client towards the RADIUS server 22. The traffic between these three entities is governed by the RADIUS protocol.

In FIG. 8, the function of the IMC has been incorporated in the RADIUS server 22. In FIG. 9, the line interconnecting the RADIUS server 22 and the PSSP 16 includes a tapping device 42 which is capable of intercepting and manipulating RADIUS messages. RADIUS response messages from the RADIUS server 22 towards the PSSP 16 are manipulated by the tapping device 42 either by manipulating an interception instruction set that is already present in the RADIUS message or by inserting a new interception instruction set under the control of the IMC 36. Tapping device 42 may for example be formed by a web switch "ALTEON" (trademark) supplied by Nortel Networks Limited.

Figure 10:
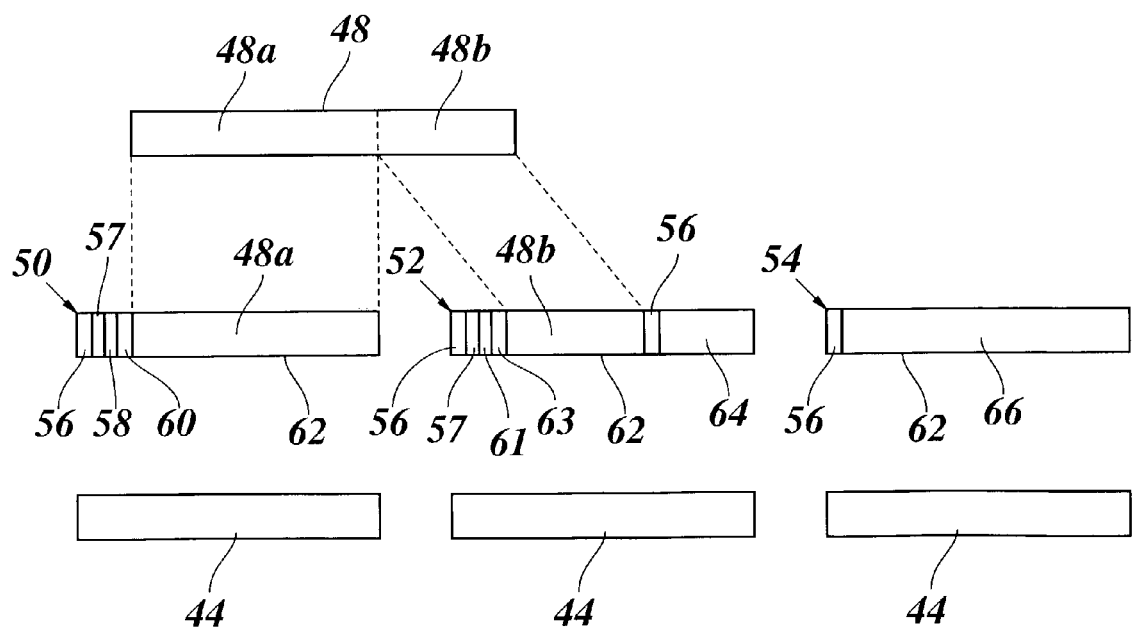
FIG. 10 illustrates a method of combining intercept traffic with dummy traffic.

FIG. 10 illustrates another embodiment of the method for obscuring the traffic between the IIF 18 and the mediation device (MD) 38 and possibly also between the MD 38 and the MC 40. Here, the traffic consists of a continuous stream of encrypted "camouflage" packets 44 of a fixed size that are constantly transmitted from the interception point (PSSP) to the mediation device, regardless of whether or not or how much true interception traffic is generated by PSSP. If there is no interception traffic at all, the camouflage packets 44 consist only of dummy data. Conversely, if the volume of true interception traffic reaches the capacity limits of the continuous stream of the camouflage packets 44, these packets are almost completely filled up with intercepted data.

The top line in FIG. 10 illustrates an intercepted data packet that has to be transmitted to the mediation device 38 and, in the example shown, has a length greater than the transport capacity of a single camouflage packet 44. Then, the contents of the intercepted packet 48 are distributed over a sufficient number of camouflage packets 44 (two in the given example), as is shown in the second line in FIG. 10. This line shows the format of transport packets, 50, 52 and 54 that are to be converted into the camouflage packets 44 through encryption. Each transport packet includes a minimum of one fragment-header, which contains at least a significance bit 56. If this bit is set to "0", then the remainder of the transport packet contains only dummy traffic(64, 66). If this bit is set to "1", the fragment header also contains, an interception ID 57, which identifies the current user-session of the target, a length field 58 and a "more" bit 60. The header—if significant—is followed by a fragment load section 62, which in case of the fragment load 62 that is contained in transport packet 50 is identical to the maximum load section of the transport packet and thus to the maximum transport capacity of a single camouflage packet. In case of the transport packet 50, the fragment load section 62 is filled to its full capacity with a first fraction 48$a$ of the intercepted packet 48. The significance bit 56 indicates that the contents of the fragment load section 62 are significant, i.e. represent true intercepted data. The "more" bit 60 indicates that fragmentation has occurred and that the subsequent fragment load section 62 includes only a fragment of the intercepted packet 48 which will be continued in the next transport packet 52. If the intercepted packets and/or an initial fragment of a packet 48 are relatively short, it is possible that two or more intercepted packets are included in multiple fragment load sections 62 contained in a single transport packet. Then each data packet or fragment has its own fragment header, as a single fragment load section 62 can also carry a full packet if it is sufficiently short. The length field 58 of the fragment header indicates the length of the corresponding fragment load section 62.

In the transport packet 50, the significance bit 56 is "1", because the fragment load section 62 carries the first fragment of the intercepted packet 48, and the "more" bit 60 is also "1", because another fragment 48$b$ of the packet 48 will be included in the next transport packet 52.

In case of the transport packet 52, the significance bit 56 is "1", but a "more" bit 63 is "0", because this transport packet will include all the rest of the current intercepted packet 48. The fragment load section 62 of packet 52 includes the last fragment 48$b$ of the intercepted packet 48, and the length of this fragment is indicated in a length field 61. Each fragment-load section is immediately followed by a next fragment header, if the fragment has not filled the transport capacity completely. In case of packet 52, another fragment header follows which consists only of the significance bit 56 (set to "0"), which means that the remainder of the transport packet is insignificant and carries only meaningless dummy data 64. However, multiple fragment sections 62 could have followed instead of dummy data 64, carrying short full packets and the last fragment section could have carried an initial fragment of a larger packet not fully fitting within the remainder of the transport packet 52.

Since, in the present example, no further intercepted packet needs to be transmitted, the next transport packet 54 has a header consisting only of the significance bit 56 with the value "0" which is consequently followed by an insignificant fragment section 66 in this case.

After the transport packets 50, 52, 54 have been encrypted to form the camouflage packets 44, it is impossible for an observer doing traffic analysis to decide whether or not true interception traffic occurs.

The length and/or the transmission frequency of the camouflage packets 44 may be varied in accordance with the overall traffic load on the network, in order to make sure that there will always be a sufficient transport capacity for the true interception traffic.

In a modified embodiment, in order to allow for variable length camouflage packets 44, the first significance bit in a camouflage packet may be replaced by a significance field, which comprises the significance bit followed by the total length of the transport packet (also implicitly defining the length of the camouflage packet 44, as depending on the encryption algorithm used, the lengths of the transport packet and of the camouflage packet would normally be the same).

What is claimed is:

1. A method for lawful interception of packet switched network services, comprising the steps of:
   when a user accesses the network and is identified by a target-ID at a primary interception point of the network, sending the target-ID to an interception management center,
   checking at the interception management center whether the user is a lawful interception target and sending an encrypted interception instruction set to a secondary interception point,
   decrypting said interception instruction set at the secondary interception point and performing an interception process in accordance with the interception instruction set, said interception process including the transmission of encrypted interception and dummy data to a mediation device, wherein said dummy data are added for obscuring true interception traffic between the secondary interception point and the mediation device, and wherein an amount of the dummy data is determined based on actual traffic load,
   wherein the interception instruction set includes a conditional interception instruction, instructing a PSSP (Packet Switching Service Point) to send intercept related information or to monitor the traffic associated with the target-ID and start the interception of the complete traffic or a portion of the traffic only when a certain trigger condition occurs, said trigger condition being one of: usage of certain network or content resources or usage of a certain catchword, virus signature or bit-pattern specified in the interception instruction set.

2. The method of claim 1, wherein said secondary interception point is identical to said primary interception point.

3. The method of claim 1, wherein the dummy data are generated at random.

4. The method of claim 1, wherein the dummy data are based on actual traffic to or from the user, but the actual traffic is scrambled such that, even after decryption, the contents thereof may not be reconstructed at the mediation device.

5. The method of claim 1, comprising a step of sending a continuous stream of camouflage packets from the secondary interception point to the mediation device, said camouflage packets including intercepted data in accordance with demand and being filled up with dummy data to their full length.

6. A system for lawful interception of packet-switched network services in a network, comprising:
   at least one interception point formed by a node in the network,
   an interception management center, and
   a mediation device serving as an interface between the network and a law enforcement agency for which interception services are provisioned,
   wherein said at least one interception point is adapted to send a target-ID of a user accessing the network to said interception management center,
   the interception management center is adapted to send to the at least one interception point an encrypted interception instruction set to be decrypted at the interception point and enabling the interception point to perform an interception process in the course of which intercepted data are encrypted and sent to said mediation device, and the at least one interception point is further adapted to generate dummy data and to encrypt and send either the intercepted data or the dummy data or a combination of these, such that the occurrence of intercepted data is obscured, wherein said interception management center contains means for communicating with said node according to a RADIUS protocol, and means for acting as a RADIUS proxy server.

7. The system of claim 6, wherein the at least one interception point is formed by the node of the network that is situated at a subscriber edge of the network, where end users connect to the network.

8. The system of claim 6, wherein the interception point is a switch adapted to connect end users to an IP or Ethernet network.

9. The system of claim 7, wherein the interception point is a switch adapted to connect end users to an IP or Ethernet network.

10. The system of claim 6, comprising a plurality of interception points connected to the same interception management center.

11. A system for lawful interception of packet-switched network services in a network, comprising:
- at least one interception point formed by a node in the network,
- an interception management center, and
- a mediation device serving as an interface between the network and a law enforcement agency for which interception services are provisioned,
- wherein said at least one interception point is adapted to send a target-ID of a user accessing the network to said interception management center,
- the interception management center is adapted to send to the at least one interception point an encrypted interception instruction set to be decrypted at the interception point and enabling the interception point to perform an interception process in the course of which intercepted data are encrypted and sent to said mediation device, and the at least one interception point is further adapted to generate dummy data and to encrypt and send either the intercepted data or the dummy data or a combination of these, such that the occurrence of intercepted data is obscured, wherein said interception management center is combined with a RADIUS server.

12. A node to perform lawful interception of data in a network, comprising:
an intercept function comprising hardware and software to:
  send an interception instruction request including a target-ID to a mediation point;
  receive an encrypted lawful interception instruction set responsive to the interception instruction request from the mediation point, the encrypted lawful interception instruction set specifying instructions regarding interception of data; and
  according to the instructions of the encrypted lawful intercept instruction set, intercept data communicated in the network,
wherein the encrypted lawful interception instruction set is received from an interception management center of the mediation point, and wherein the intercept function is configured to send the intercepted data to a mediation device in the mediation point, the mediation device serving as an interface between the network and a law enforcement agency.

13. The node of claim 12, wherein the intercept function is configured to send the target-ID to a RADIUS server to trigger an authentication procedure.

14. The node of claim 12, wherein the intercept function is configured to add dummy data to the intercepted data to obscure the interception data between the intercept module and the mediation point, and wherein an amount of the dummy data is dynamically determined based on actual load traffic.

15. The node of claim 12, wherein sending of the interception instruction request by the intercept module is triggered by a log-on event by a user.

* * * * *